(12) United States Patent
Parsons et al.

(10) Patent No.: US 10,123,923 B2
(45) Date of Patent: Nov. 13, 2018

(54) AUTO LEVELING LOW PROFILE PATIENT SUPPORT APPARATUS

(71) Applicant: Sizewise Rentals, L.L.C., Kansas City, MO (US)

(72) Inventors: Troy Parsons, Ellis, KS (US); Jeff Sprier, Hays, KS (US); Eric Boss, Ellis, KS (US); Craig McGuire, Hays, KS (US); Michael D. Halleck, Brighton, CO (US); Jeffrey Tad Samson, Boulder, CO (US); Doug Zaugg, Ferndale, WA (US); John Tomasik, Golden, CO (US)

(73) Assignee: Sizewise Rentals, L.L.C., Lenexa, KS (US)

(*) Notice: Subject to any disclaimer, the term of this patent is extended or adjusted under 35 U.S.C. 154(b) by 497 days.

(21) Appl. No.: 13/771,820

(22) Filed: Feb. 20, 2013

(65) Prior Publication Data

US 2013/0219382 A1     Aug. 22, 2013

Related U.S. Application Data

(60) Provisional application No. 61/601,303, filed on Feb. 21, 2012.

(51) Int. Cl.
*A61G 7/018* (2006.01)
*A61G 7/012* (2006.01)
(Continued)

(52) U.S. Cl.
CPC ............ *A61G 7/018* (2013.01); *A61G 7/012* (2013.01); *A61G 7/015* (2013.01); *A61G 7/0513* (2016.11);
(Continued)

(58) Field of Classification Search
CPC .......... A47C 19/045; A61G 7/00; A61G 7/10; A61G 7/1019; A61G 19/045
See application file for complete search history.

(56) References Cited

U.S. PATENT DOCUMENTS

| | | | |
|---|---|---|---|
| 4,908,844 A * | 3/1990 | Hasegawa | A61B 6/0457 378/209 |
| 5,235,258 A | 8/1993 | Schuerch | |

(Continued)

*Primary Examiner* — Robert G Santos
*Assistant Examiner* — Ifeolu A Adeboyejo
(74) *Attorney, Agent, or Firm* — Spencer Fane LLP (57) ABSTRACT

A patient support apparatus (20) including a patient support surface (22) and a repositioning mechanism (24) for vertically and angularly repositioning the surface (22). The apparatus (20) including sensors (84) for automatically detecting and inhibiting attempts to vertically reposition the surface (22) when it is at a particular angular position, and attempts to angularly reposition the surface (22) when it is at a particular vertical position. The apparatus (20) also includes a tilt control system (88) for limiting the extent to which head or foot ends (36,38) of the surface (22) can be angularly repositioned, a scale (92) and a warning system (120) for communicating a warning when a change in the weight on the surface (22) is indicative of a patient moving or attempting to move off of the surface (22), a sensor (122) for detecting an increase in amperage during an operation and stopping the operation, and an ability to update microcontroller programming via a controller area network bus (102).

9 Claims, 9 Drawing Sheets

(51) Int. Cl.
*A61G 7/015* (2006.01)
*G01G 19/52* (2006.01)
*G06F 8/65* (2018.01)
*G01G 19/44* (2006.01)
*A61G 7/05* (2006.01)
*G01G 23/37* (2006.01)

(52) U.S. Cl.
CPC .......... *G01G 19/445* (2013.01); *G01G 19/52* (2013.01); *G06F 8/65* (2013.01); *A61G 2203/42* (2013.01); *A61G 2203/72* (2013.01); *A61G 2203/723* (2013.01); *G01G 23/3735* (2013.01)

(56) References Cited

U.S. PATENT DOCUMENTS

| | | | | |
|---|---|---|---|---|
| 5,697,110 A * | 12/1997 | Campbell | ............ | A61G 7/1019 177/144 |
| 5,708,993 A * | 1/1998 | Campbell | ............ | A61G 7/1019 177/144 |
| 6,353,949 B1 * | 3/2002 | Falbo | ............ | A61G 13/04 5/610 |
| 7,472,437 B2 * | 1/2009 | Riley | ............ | A47C 19/045 250/221 |
| 7,834,768 B2 * | 11/2010 | Dixon | ............ | A61G 7/05 340/573.1 |
| 8,039,766 B2 * | 10/2011 | Flanagan | ............ | A61G 7/018 177/144 |
| 2002/0059679 A1 * | 5/2002 | Weismiller | ............ | A61G 7/00 5/610 |
| 2004/0163175 A1 * | 8/2004 | Vogel | ............ | A61G 7/00 5/620 |
| 2005/0172405 A1 * | 8/2005 | Menkedick | ............ | A61B 5/1115 5/618 |
| 2006/0010601 A1 * | 1/2006 | Riley | ............ | A47C 19/045 5/600 |
| 2007/0163043 A1 | 7/2007 | Lemire | | |
| 2008/0092291 A1 | 4/2008 | Rawls-Meehan | | |
| 2008/0148485 A1 * | 6/2008 | Barthelt | ............ | A61G 7/012 5/611 |
| 2008/0289108 A1 * | 11/2008 | Menkedick | ............ | A61G 7/005 5/610 |
| 2012/0060290 A1 * | 3/2012 | Jones | ............ | A61G 13/0018 5/611 |
| 2012/0174314 A1 * | 7/2012 | Clement | ............ | A61G 7/10 5/81.1 R |
| 2012/0317726 A1 * | 12/2012 | Riley | ............ | A47C 19/045 5/611 |
| 2013/0340165 A1 * | 12/2013 | Dong | ............ | A61B 6/102 5/601 |

* cited by examiner

AUTO LEVELING LOW PROFILE PATIENT SUPPORT APPARATUS

RELATED APPLICATIONS

The present non-provisional patent application claims priority of an earlier-filed provisional patent application titled AUTO LEVELING LOW PROFILE PATIENT SUPPORT, Ser. No. 61/601,303, filed Feb. 21, 2012. The contents of the identified earlier-filed application are hereby incorporated by reference into the present application.

FIELD OF INVENTION

The present invention relates broadly to wheelchairs, beds, tables, and other such person-supporting apparatuses. More specifically, the present invention concerns a vertically and angularly repositionable person-supporting apparatus, such as is used to support a bariatric patient weighing approximately between 400 and 1200 pounds, and the operation and control of such an apparatus.

BACKGROUND

Apparatuses for supporting persons, such as, for example, hospital beds for supporting bariatric patients weighing approximately between 400 and 1200 pounds, are sometimes provided with the ability to vertically reposition (i.e., raise and lower) and angularly reposition (i.e., tilt and level) portions or all of a patient support surface to facilitate repositioning or otherwise moving a patient sitting or lying thereon. Due to design constraints, vertically repositioning the patient support surface while it is in certain angular positions, or angularly repositioning the patient support surface while it is in certain vertical positions, can bring components of the apparatus into damaging contact with each another. For example, if the support surface is lowered too far when it is angled too much, it may strike a base or other component of the apparatus, and, similarly, if the support surface is angled too much when it is too low, it may strike the base or other component.

Furthermore, it can be medically or otherwise undesirable for some patients to exceed a maximum or minimum head or foot elevation while lying on such apparatuses, or to move off of such apparatuses without calling for assistance or against medical advice.

Additionally, such apparatuses may have complex onboard electronic functionality with associated software or firmware that must be periodically updated or otherwise changed. In prior art systems, performing remote updates on the apparatus' functionality could be problematic, and, if performed improperly, could render one or more functionalities or the entire system nonfunctional. One problem occurs when there is an interruption of the update process, which can render the new image incomplete and nonfunctional. One solution to this problem has been to keep two firmware images in memory and alternate firmware updates. Unfortunately, many functionalities are associated with small microcontrollers that have limited memory space that cannot accommodate two images. Another problem arises because firmware is often stored in flash memory so it is not possible to continue executing code from a block of memory while it is being updated. In some apparatuses, firmware is run from RAM memory while the flash memory is being re-written. Unfortunately, many apparatuses or particular functionalities have insufficient RAM to implement this solution.

Due to these and other concerns, a need exists for an improved patient support apparatus.

SUMMARY OF THE INVENTION

The present invention addresses the above-identified and other concerns by providing an improved patient support apparatus, which can be used, for example, to support a bariatric patient weighing approximately between 400 and 1200 pounds. In one embodiment, the patient support apparatus comprises a patient support surface; a base frame; and a repositioning mechanism extending between the patient support surface and the base frame, and operable to vertically reposition and angularly reposition the patient support surface relative to the base frame.

In various other embodiments, the apparatus may include one or more of the following additional features. The apparatus may include one or more sensors operable to automatically detect and inhibit an attempt to vertically reposition the surface when it is in a particular angular position, and to automatically detect and inhibit an attempt to angularly reposition the surface when it is in a particular vertical position. The apparatus may include a tilt control system operable to prevent raising or lowering a head or foot end of the surface beyond a minimum or maximum extent, and an input device operable to allow for specifying the minimum or maximum extent. The apparatus may include a scale operable to determine a weight on the surface, and a warning system operable to receive input from the scale, to determine changes in the weight, and to communicate a warning when a change in the weight is indicative of a patient attempting to get off of the surface. The apparatus may include one or more sensors operable to monitor an amperage used during the vertical or angular repositioning operations, and to stop the operations if a change in the amperage exceeds a particular amount for a particular time. The apparatus may include one or more microcontrollers, with each microcontroller being operable to perform a function and having updateable programming, and a controller area network bus operable to carry electronic signals between the microcontrollers and an external program update source, wherein when it is desirable to update the programming of the microcontrollers an updated program is communicated by the source to the microcontrollers via the bus.

These and other features of the present invention are discussed in greater detail in the section below entitled.

BRIEF DESCRIPTION OF THE DRAWINGS

The present invention is described herein with reference to the following drawing figures, which are not necessary to scale.

DETAILED DESCRIPTION

With reference to the figures, a patient support apparatus 20 is herein described, shown, and otherwise disclosed in accordance with one or more embodiments of the present invention, including one or more preferred embodiments. It will be appreciated that various embodiments of patient support apparatuses operable to vertically reposition and/or angularly reposition their patient support surfaces are known. The features of the present invention may be incorporated into many or all such embodiments generally without regard to many or all differences, including, for example, how repositioning is achieved. As such, description herein of the exemplary patient support apparatus 20 is generally limited to aspects relevant to or helpful in understanding the present invention.

Figure 1:
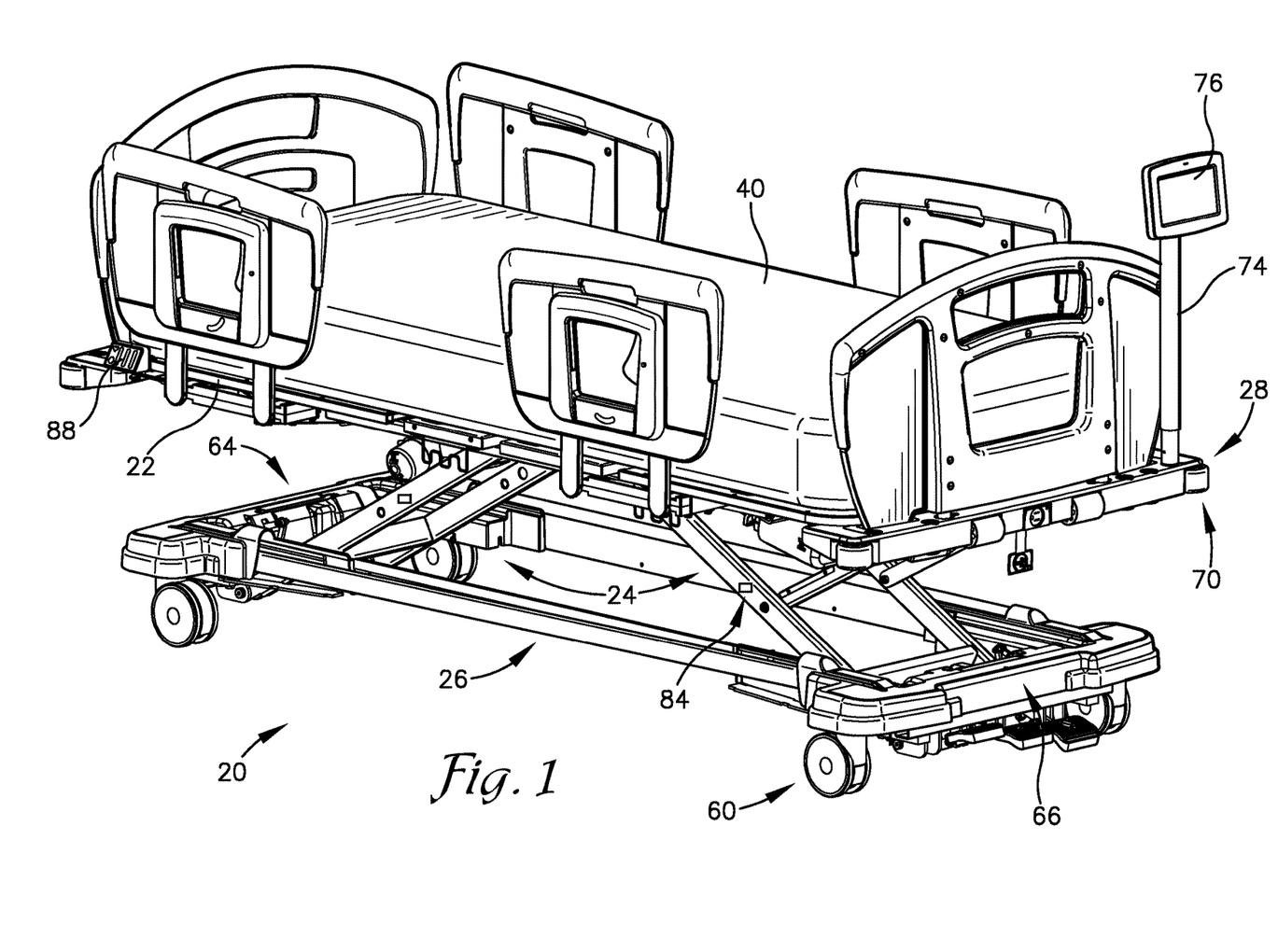
FIG. 1 is an isometric view of an embodiment of the patient support apparatus of the present invention.

Referring to FIG. 1, the patient support apparatus 20 broadly comprises a patient support surface 22, a repositioning mechanism 24, a base frame 26, and one or more bumper components 28. In one embodiment the base frame 26 is a wheel frame. In one application, the apparatus 20 is used to support a bariatric patient weighing approximately between 400 and 1200 pounds.

Figure 6:
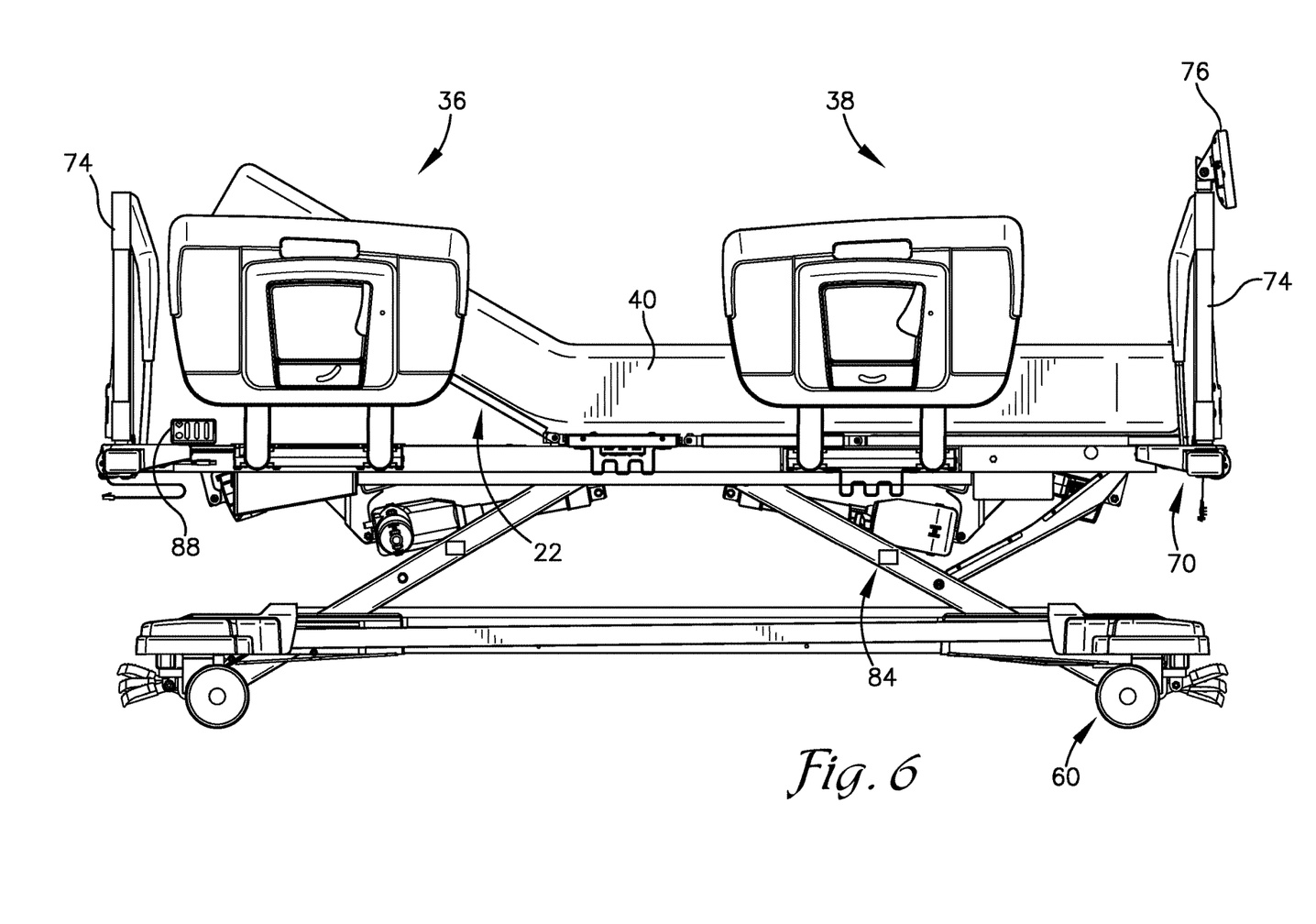
FIG. 6 is a side elevation view of the patient support apparatus shown in FIG. 1, wherein a head portion of the patient support surface is shown elevated relative to the remainder of the surface.

The patient support surface 22 may be a substantially flat or contoured surface and may be articulated to allow for tilting one or more portions of the surface, e.g., a head portion or a foot portion 36,38 (as shown in FIG. 6), relative to the remainder of the surface in order to elevate the head or feet of a patient lying or sitting on the surface 22. When the apparatus 20 is configured as a hospital bed, the patient support surface 22 may accommodate a mattress 40 on which the patient is able to lay or sit.

Figure 2:
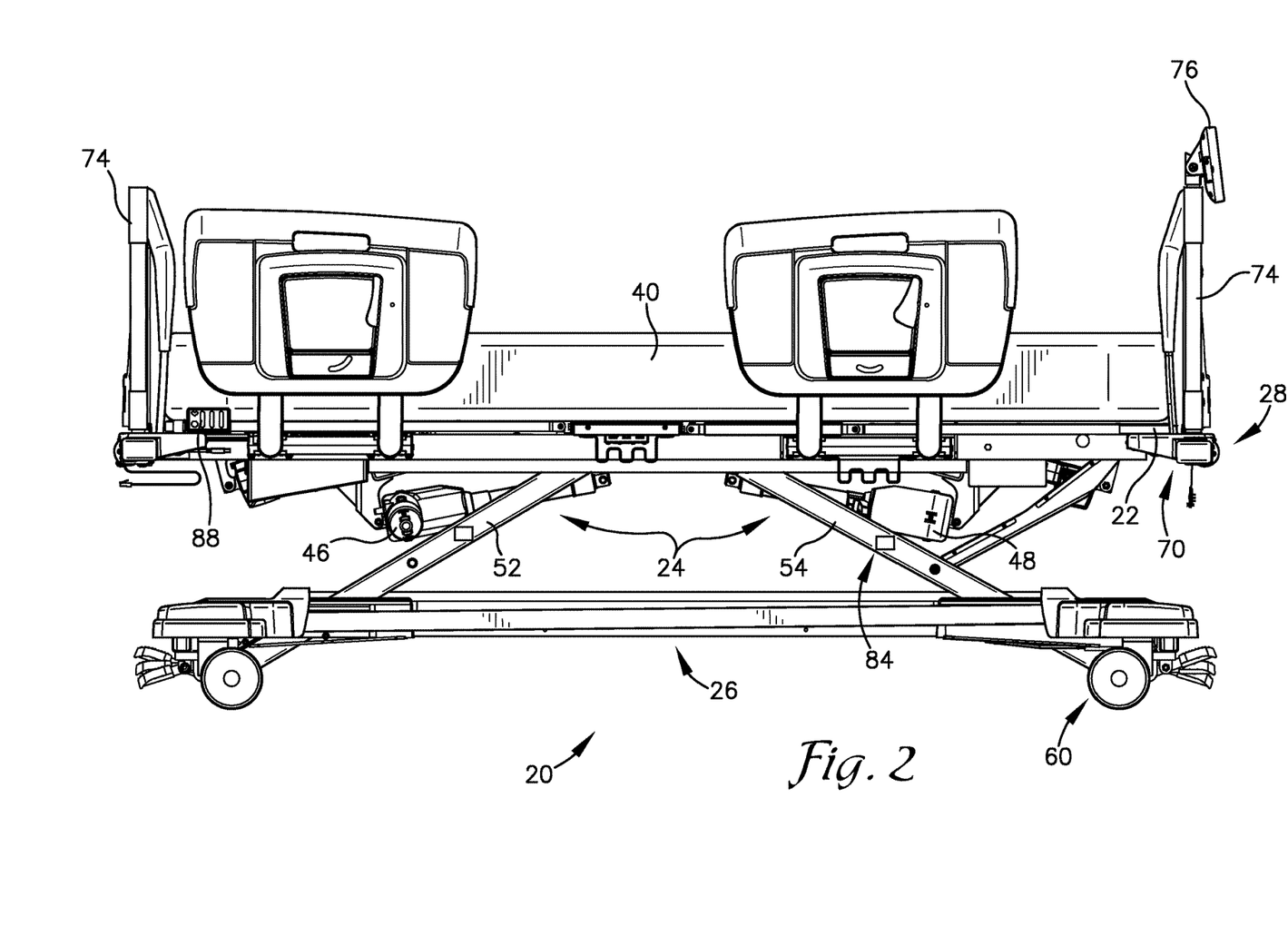
FIG. 2 is a side elevation view of the patient support apparatus shown in FIG. 1, wherein a patient support surface is shown positioned at an intermediate height.
Figure 3:
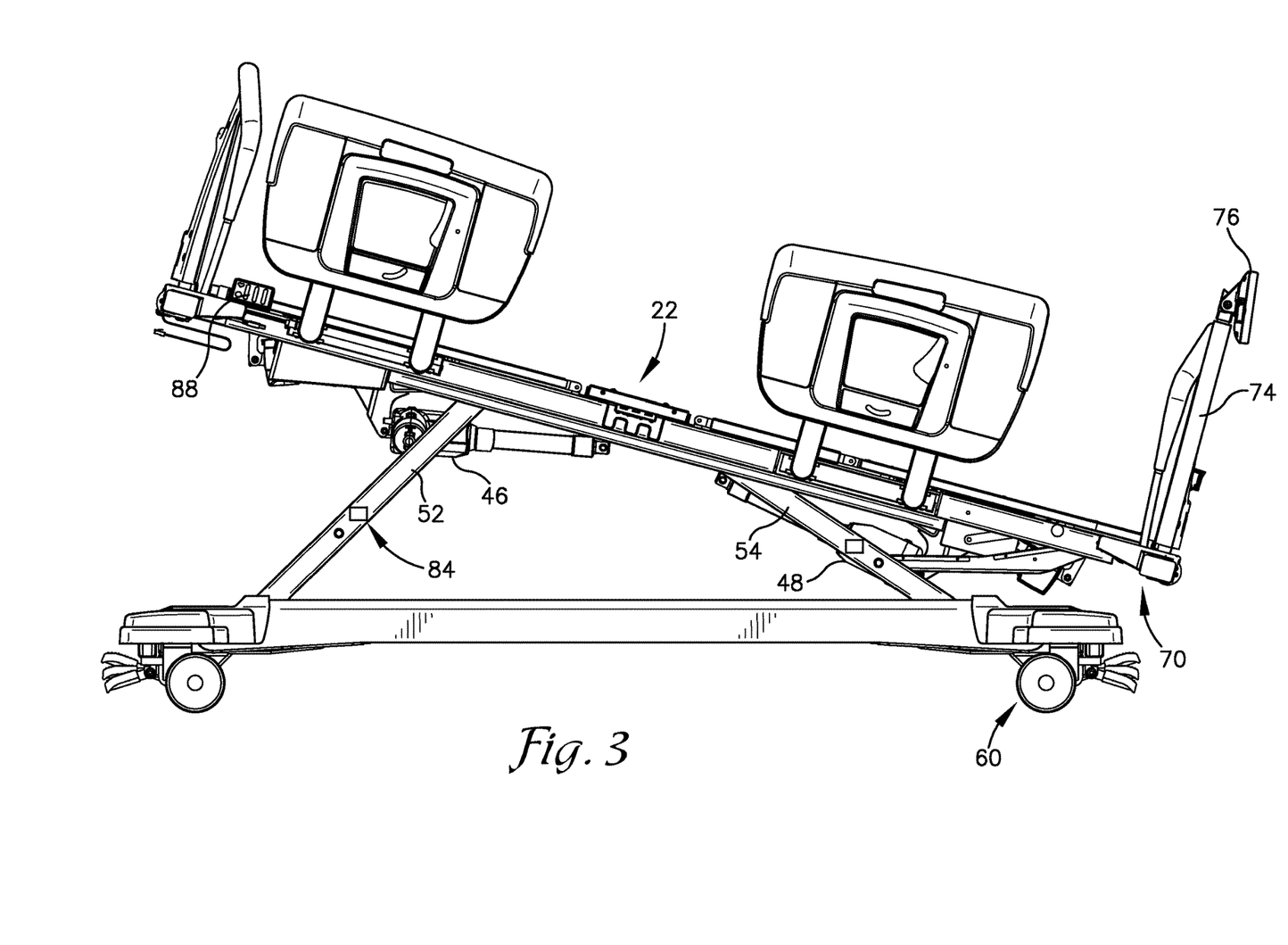
FIG. 3 is a side elevation view of the patient support apparatus shown in FIG. 1, wherein the patient support surface is shown positioned at an angle.
Figure 4:
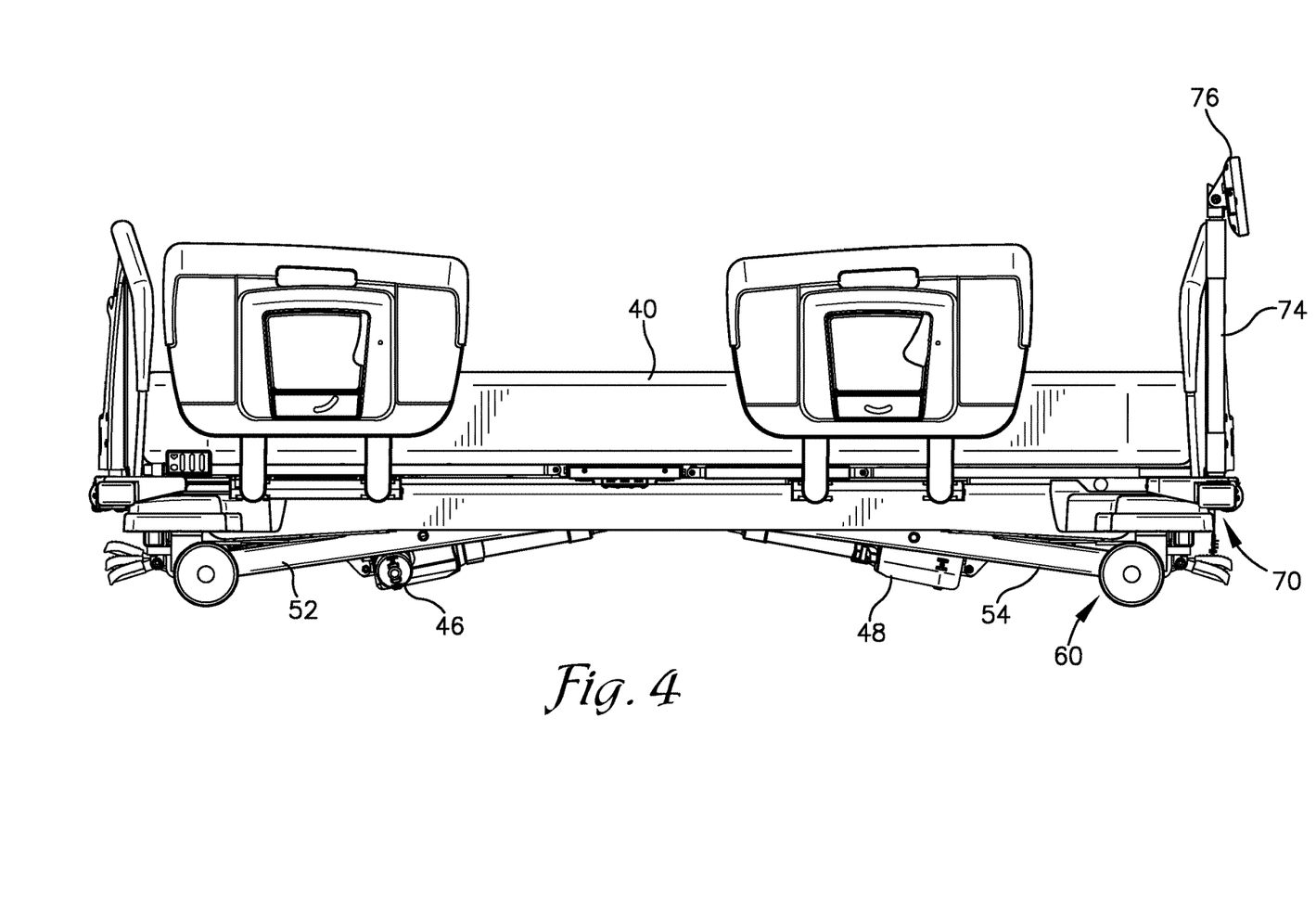
FIG. 4 is a is a side elevation view of the patient support apparatus shown in FIG. 1, wherein the patient support surface is shown positioned at a lowest height.

The repositioning mechanism 24 extends between the patient support surface 22 and the wheel frame 26, and is operable to vertically reposition (i.e., raise and lower) and angularly reposition (i.e., tilt and level) portions or all of the patient support surface 22 relative to the wheel frame 26. Referring also to FIGS. 2, 3, and 4, in one contemplated implementation such repositioning is accomplished by oppositely oriented first and second lift actuators 46,48 which operate to pivot respective first and second frame members 52,54 between an unfolded or raised position (as shown in FIG. 2) and a folded or lowered position (as shown in FIG. 4). As shown in FIGS. 2 and 4, by pivoting both frame members 52,54 equally, the patient support surface 22 can be vertically repositioned. As shown in FIG. 3, by pivoting one frame member 52 relative to the other 54, or by pivoting both frame members 52,54 in opposite directions, the patient support surface 22 can be angularly repositioned.

The wheel frame 26 movably supports the repositioning mechanism 24 and the patient support surface 22, and includes several wheels, casters, or otherwise rollable members 60. In one contemplated implementation, the wheel frame 26 is approximately rectangular in overall shape with first and second end members 64,66 and a wheel 60 at each corner.

Figure 5:
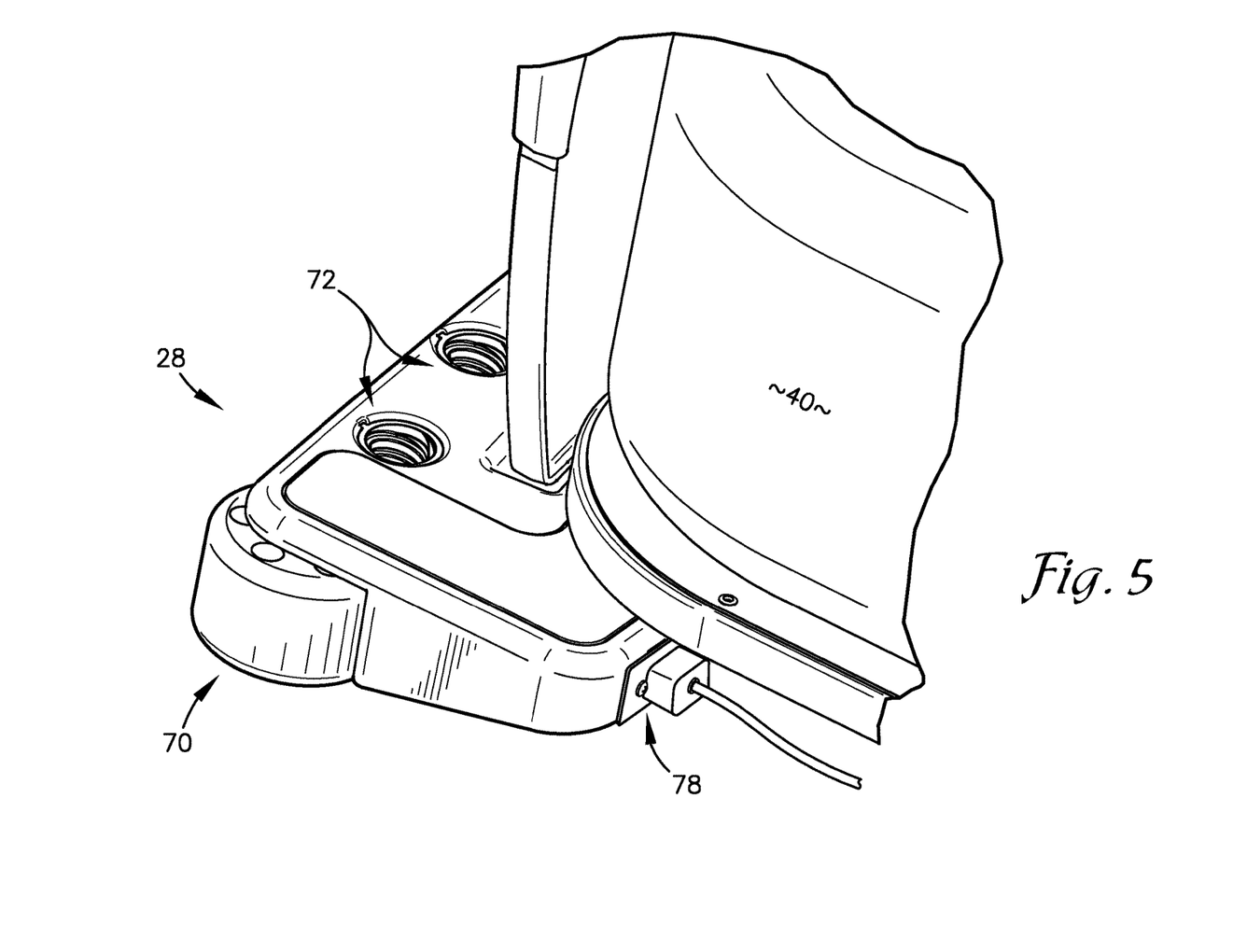
FIG. 5 is a fragmentary isometric view of a bumper component of the patient support apparatus shown in FIG. 1.

Referring also to FIG. 5, the one or more bumper components 28 are associated with the patient support surface and operable to prevent damage when the apparatus 20 contacts another object or surface, operable to receive and support removable members, and operable to provide an electronic connection or interface for the apparatus' electronic components. In one implementation, the bumper component 28 includes a relatively flexible contact element 70, which may take the form of a rubber or plastic wheel or otherwise rounded structure, to prevent damage when the apparatus 20 contacts another object or surface, such as a wall. In one implementation, the bumper component 28 includes one or more sockets 72 to receive and maintain the removable members, such as vertical poles 74 (as shown in, e.g., FIG. 1) which may be used to move or guide the apparatus 20 or to support electronic devices 76 such as control interfaces or monitors. The control interface 76, in one aspect, is movable between different locations and positions around the apparatus 20, and in another aspect, the control interface is mountable in different locations and positions on the apparatus 20. In one implementation, the bumper component 28 includes a male or female electrical connection 78 for connecting the apparatus' electronic components to other electronics or to a power supply. The exemplary approximately rectangular apparatus 20 shown in the figures includes four such bumper components 28, with one being located at each corner; however, it will be appreciated that more or fewer bumper components may be used. Additional functional components may be incorporated into or otherwise associated with the bumper components 28 including, for example, obstruction sensors; pinch point sensors; end, head, foot, and side boards; bed status and safety lights; beacons; auxiliary and 120 volt outlets; trapezes; transport shelves; oxygen holders; CPR boards; and IV poles.

Vertically repositioning the patient support surface 22 to a low or lowest elevation while the surface 22 is not level, or attempting to angularly reposition the surface 22 while the surface 22 is at the low or lowest elevation, may result in a portion of the repositioning mechanism 24 contacting the first or second end members 64,66 or other portion of the wheel frame 26 in such a manner as to cause damage to one or both. To facilitate avoiding such damage, an embodiment of the apparatus 20 includes one or more sensors 84 operable to automatically detect the angled patient support surface 22 reaching a minimum safe height and to automatically prevent the potentially damaging condition. In one implementation, a sensor 84 is located on each of the first and second frame members 52,54 such that, when the surface is 22 lowered to a minimum safe height, the sensors 84 are operable to determine whether the surface 22 is level and, if it is not level, to automatically initiate leveling of the surface 22 by the repositioning mechanism 24 so that damage does not occur. In one implementation, the surface 22 is completely leveled when the sensors 84 are activated. In another implementation, the surface 22 is incrementally leveled when the sensors 84 detect that the angled surface 22 is within a predetermined distance of the minimum safe height, and is only completely leveled when it reaches the minimum safe height to avoid damage—thereby allowing the bed to continue lowering as it levels. The minimum safe height will vary depending on such factors as the physical design of the repositioning mechanism 24 and the wheel frame 26. However, the minimum safe height may correspond to a portion of the repositioning mechanism 24 being within approximately 6 inches, or within approximately 1 inch, of the first or second end members 64,66 of the wheel frame 26. Similarly, the predetermined distance from the minimum safe height may be approximately 12 inches, approximately 6 inches, or approximately between 1 inch and 6 inches. The sensors 84 may be implemented using any suitable electronic, mechanical, optical, or other mechanism. In one embodiment, string pots are used to sense the incline of the surface 22.

Referring to FIG. 6, in an embodiment of the apparatus 20, a tilt control system 88 is operable to limit the maximum or minimum extent to which the head or foot ends 36,38 are raiseable or lowerable. In one implementation, an input device allows for specifying the maximum or minimum angle, such that the tilt control system 88 prevents raising or lowering that exceeds the specified angle. In various implementations the maximum and minimum angles are specifiable in increments of 1, 2, 5, 10, or 15 degrees.

Figure 7:
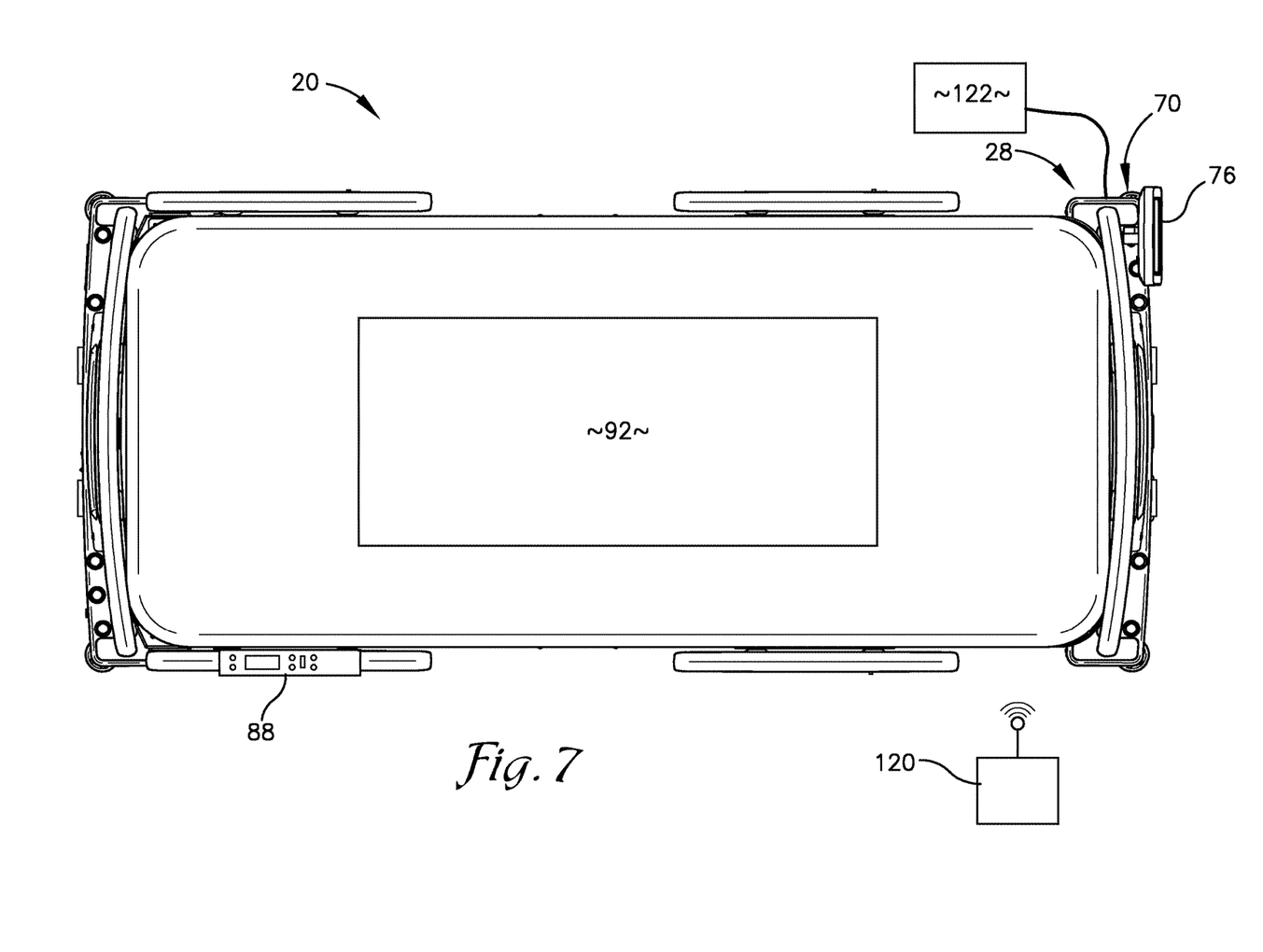
FIG. 7 is a plan view of the patient support apparatus shown in FIG. 1, wherein a scale component is shown associated with the patient support surface.

Referring to FIG. 7, in an embodiment of the apparatus 20, a scale 92 is operable to periodically or continuously determine weight on the patient support surface 22. A warning system 120 (shown diagrammatically in FIG. 7) receives input from the scale 92 and is operable to determine changes in the weight. In one implementation, the warning system utilizes wireless technology for communication over a LAN, WAN, Internet, or other network, in another the warning system 120 is wired. In one implementation, a change in weight of approximately between −9 and +9 pounds, or approximately between −4 and +4 pounds, causes the warning system to communicate that a person on the patient support surface 22 is moving; a change in weight of approximately between −15 and −5 pounds, or approximately −10 pounds, causes the warning system to communicate that the person is attempting to get off of the surface 22; and a change in weight of approximately between −25 and −15 pounds, or approximately −20 pounds, causes the warning system to communicate that the person is getting off of the surface 22. In one implantation, an operator selects the weight changes that activate the various warning signals.

In one embodiment, the patient support apparatus 20 includes a sensor 122 (shown diagrammatically in FIG. 7) in communication with the apparatus 20 to monitor the power or some indicator thereof used by the apparatus 20 during raising, lowering, and tilting operations. Thus, the sensor 122 may include a power, voltage, or current sensor or other sensor, and may include multiple sensors 122, including one sensor 122 for each lift actuator 46,48. In one implementation, the sensor 122 monitors the amperage used by the lift actuators 46,48. If the sensor 122 detects a sufficiently high change in the power or the amperage used by the apparatus 20 during an operation, the apparatus 20 ceases that operation (step 304). In one implementation, a controller receives the power or amperage data from the sensor 122 and stops the operation if the power or amperage is sufficiently high to indicate that there is an obstruction to the operation. In various implementations, an increase of approximately 0.5 amperes, approximately between 0.5 and 10 amperes, approximately between 0.5 and 3 amperes, or between approximately 1 and 1.5 amperes indicates that there is an obstruction.

As the apparatus 20 begins an operation, there is a period during which the power or amperage used can be higher than the sufficiently high threshold of change in power or amperage that indicates an obstruction to the operation, so, in one embodiment, the power or amperage is not monitored during that period or, alternatively, the operation will not be stopped if the sufficiently high threshold is reached during the period. In one implementation, the period can be set by a user within a range of approximately between $1 \times 10^2$ milliseconds and 1 second.

In another embodiment, the sensor 122 also monitors the duration of the change in amperage, and the apparatus 20 or controller will stop the operation when the sufficiently high amperage change has occurred for a sufficiently long duration to indicate an obstruction to the operation of the apparatus 20. In various implementations, the duration of sufficiently high change in amperage is at least approximately 1 millisecond, approximately between 1 millisecond and 1 second, approximately between 1 millisecond and 0.5 second, or approximately between 5 milliseconds and 0.5 second.

Figure 9:
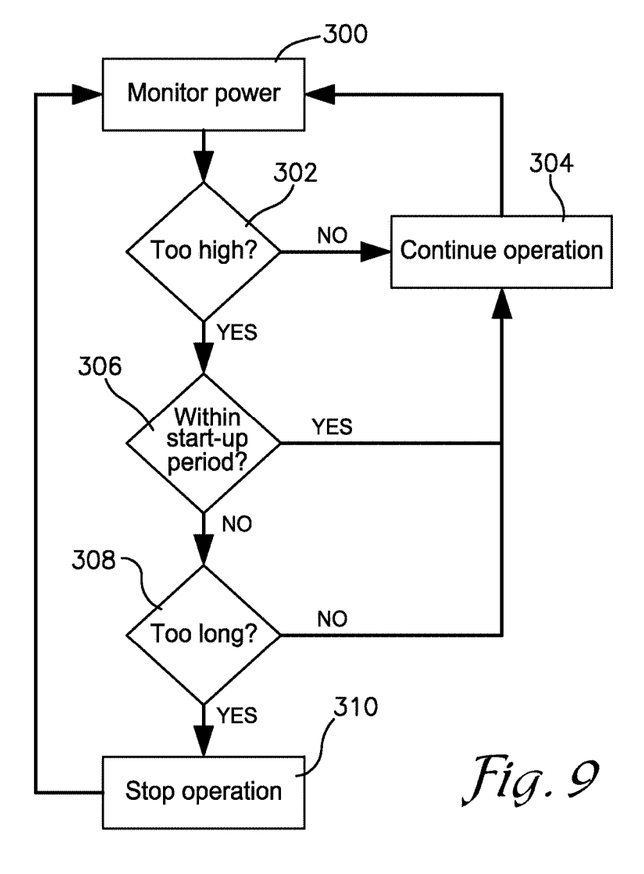
FIG. 9 is a flowchart of steps involved in an operation of the patient support apparatus shown in FIG. 1.

Thus, in one implementation, illustrated in FIG. 9, in step 300, the sensor 122 monitors the power used by the apparatus 20 during an operation and, in step 302, determines whether the power usage is sufficiently high to indicate an obstruction. If no obstruction is indicated, then, in step 304, the operation is continued. If the power usage does exceed the threshold, then, in step 306, the sensor 122 determines whether the operation is still within its initial start-up period. If the operation is still within its initial start-up period, then, in step 304, the sensor 122 continues the operation. If the operation is not within the initial start-up period, then, in step 308, the sensor 122 determines whether the power usage has exceeded the threshold for a minimum amount of time. If the power usage has not exceeded the threshold for the minimum amount of time, then, in step 304, the operation is continued. If the power usage has exceeded the threshold for the minimum amount of time, then, in step 310, the operation is stopped.

In one embodiment, the apparatus 20 includes complex onboard electronic functionality, such as, for example, the above-described repositioning control system, the tilt control system 88, and the scale 92 and movement warning system, having associated software or firmware that must be periodically updated or otherwise changed. These electronic functionalities can be characterized as independent Nodes 100 which communicate with each other and with external systems via a modified controller area network (CAN) bus 102. The CAN bus 102 comprises CAN communications signals and a power bus to allow for powering the Nodes 100. The CAN bus 102 provides a number of advantages, including that it allows for a consistent communications protocol; it allows for the Nodes 100 to be implemented as simply as possible in the apparatus 20, thereby keeping overall system complexity manageable; it facilitates future feature and functionality enhancements; and it allows for systematic system verification and validation.

Figure 8:
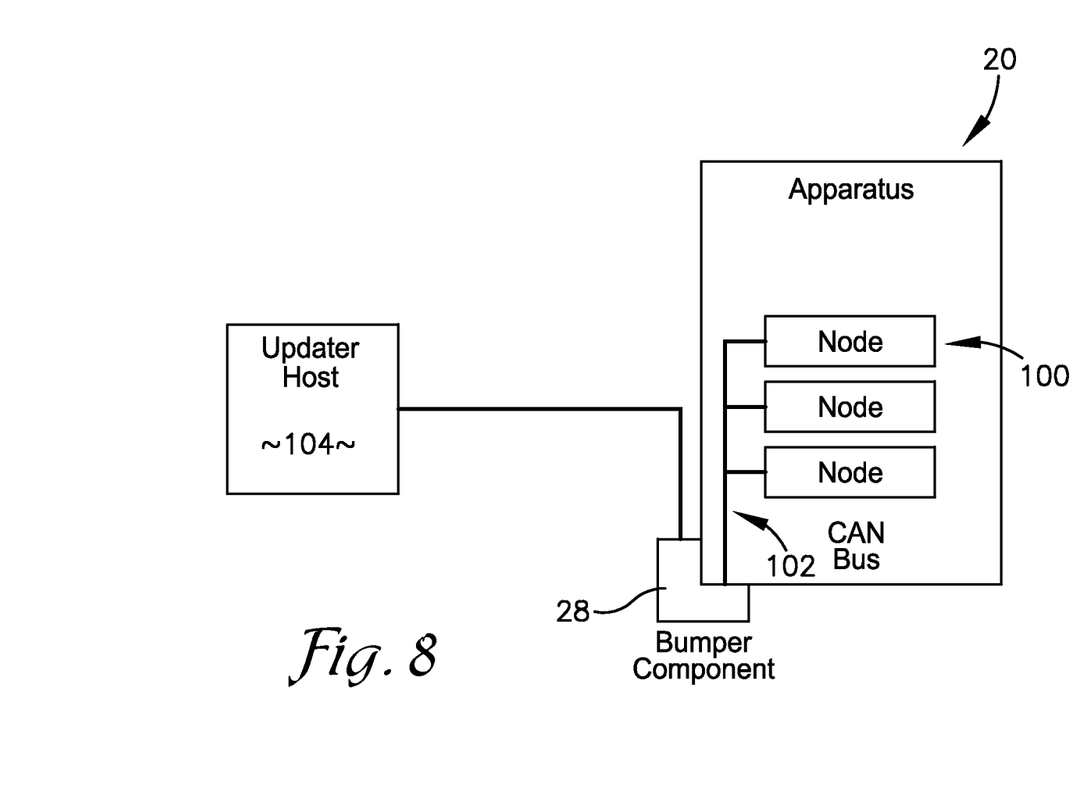
FIG. 8 is a block diagram of components of the patient support apparatus shown in FIG. 1 associated with a node-updating feature using a controller area network bus.

The present invention updates Nodes 100 within the apparatus 20 via the CAN bus 102 as follows. As shown in FIG. 8, the CAN bus 102 connects an Updater Host 104 to the Node 100 to be updated. The Updater Host 104 may be, for example, a controller or a personal computer that is connected to the CAN bus 102 via, e.g., the sockets 72 on the bumper component 28 of the apparatus 20. The Updater Host 104 opens an image file. In one implementation, decoding the image file is done on the Node 100 side, in which case the format of the image file is not relevant to the Updater Host 104. The Node 100 is the target for updating. In one implementation, the Node 100 has two areas in flash memory: Boot Loader and Application. The Boot Loader resides in a page in flash memory and is not updated. The Boot Loader contains a boot handling algorithm and a Flash Loader, and the Boot Loader process is described in more detail below. The Application is the functional firmware, i.e., that which is upgraded during the upgrading process.

The Application contains a Magic Word which is stored in a fixed location, such as, for example, a vector table, and contains a value that is not found in a normal vector table. The Magic Word is the last entry programmed, and indicates that the new Application has been programmed without errors. More specifically, the Magic Word indicates to the Boot Loader that a viable Application exists. If the Magic Word is correct, the Boot Loader can jump to the Application in two steps: (1) load the correct stack pointer values from a fixed location in the vector table, and (2) jump to a Reset vector which is also located in a fixed location in the vector table. These are the same actions that the Node's microcontroller would otherwise follow during a power-up boot sequence. The Flash Loader is part of the Boot Loader and receives data via the CAN bus 102 and programs the corresponding memory locations in the flash memory.

In one implementation, only one Node 100 can be programmed at a time. In order to avoid interruptions due to other traffic on the CAN bus 102, a CAN mailbox is reserved and is only defined and used when an update is occurring. An Updater Host CAN update mailbox is also created.

In an exemplary application, the updating process may include the following steps. The Boot Loader starts when the system is reset or when called by the Application. Broadly, the Boot Loader initiates the Flash Loader and checks the Magic Word, and, if it is correct, jumps to the Application. More specifically, the Flash Loader erases the Application flash memory, and tells the Updater Host 104 to begin sending update data. The Flash Loader receives bytes via the CAN bus 102 and decodes them to memory locations and values, depending on the data file format stored on the Updater Host 104, until an end-of-file indicator is received. A checksum is calculated and compared with an expected value to check for errors. Once the program is verified to be error-free, the Magic Word is programmed. The Magic Word indicates to the Boot Loader that a good Application resides in flash memory, and the Boot Loader jumps to the Application.

In addition to the functionality required for the Node's firmware, the Node 100 must also be able to jump back to the Boot Loader when the update command is received when the Application is active. The response is issued within the Boot Loader and allows for time to erase the Application flash memory.

The Updater Host 104 opens the data file for the Node 100 to be updated, and sends the update command to the Node 100. When the update command is received, the Node 100 jumps to the Boot Loader and waits for a response. The Node 100 erases flash memory and sets up a Flash Loader mailbox address. The Updater Host 104 reads the data file and builds data packets. The Node 100 reads the data, decodes the memory address and the data packets, and programs the data locations in the firmware.

If the updating process is interrupted, the application will be incomplete and the Magic Word will be incorrect. If there is a flash programming error or a flash erase error, the checksum will not be correct and the Magic Word will not be programmed. Both cases may result in the Node 100 being reset and a new attempt being initiated to update via the Updater Host 104. If the Application has an error which does not allow the Flash Loader to be executed, no update command will be given. In this case, the Node 100 may be reset and reprogrammed before the Boot Loader jumps to the Application. If the Node Boot Loader becomes corrupted, no update command will be given. In this case, the Boot Loader may be reprogrammed.

Although the invention has been disclosed with reference to various embodiments, implementations, and applications, it is understood that equivalents may be employed and substitutions made without departing from the contemplated scope of the invention.

Having thus described the preferred embodiment of the invention, what is claimed as new and desired to be protected by Letters Patent includes the following:

1. A patient support apparatus comprising:
   a patient support surface;
   a base frame;
   a repositioning mechanism including a first frame member and a second frame member, the frame members extending between the patient support surface and the base frame, and operable to vertically reposition and angularly reposition the patient support surface relative to the base frame;
   at least one amperage sensor operable to monitor an amperage used by the patient support apparatus during the vertical repositioning and angular repositioning operations;
   a first frame member sensor located on the first frame member;
   a second frame member sensor located on the second frame member;
   wherein the frame member sensors are operable to monitor the vertical position and angular position of the patient support surface;
   a controller in operative communication with the at least one amperage sensor and the first and second frame member sensors; and
   wherein the repositioning mechanism automatically levels the patient support surface when the patient support surface is vertically repositioned to a minimum height.

2. The patient support apparatus as set forth in claim 1, wherein the patient support surface accommodates a mattress, and the base frame is substantially rectangular in shape and includes at least one rollable member at each corner.

3. The patient support apparatus as set forth in claim 1, wherein the repositioning mechanism oppositely oriented first and second lift actuators which pivot the first and second frame members between a first position in which the patient support surface is raised relative to the base frame, and a second position in which the patient support surface is lowered relative to the base frame, and wherein when the first and second frame members are pivoted equally the patient support surface is vertically repositioned and when the first and second frame member are pivoted unequally the patient support surface is angularly repositioned.

4. The patient support apparatus as set forth in claim 1, wherein:
   the at least one sensor is selected from a group comprising a power sensor, a voltage sensor, and a current sensor; and
   the repositioning mechanism comprises a plurality of lift actuators, wherein each actuator includes at least one sensor.

5. The patient support apparatus as set forth in claim 1, wherein if the sensor detects a change in the amperage used by the apparatus during an operation that is outside a particular amperage range, the apparatus ceases that operation.

6. The patient support apparatus as set forth in claim 5, wherein the particular range is at least approximately 0.5 amps.

7. The patient support apparatus as set forth in claim 5, wherein the controller receives power amperage data from the sensor and stops the operation if the power or amperage is outside the particular range.

8. The patient support apparatus as set forth in claim 1, wherein the sensor monitors a duration of change in amperage, and the controller stops an operation when an amperage change is outside a particular range for a particular duration.

9. The patient support apparatus as set forth in claim 8, wherein the particular duration is at least approximately 1 millisecond.

\* \* \* \* \*